Aug. 18, 1936.  A. H. OELKERS  2,051,649
TRUCK
Filed Feb. 19, 1932  11 Sheets-Sheet 1
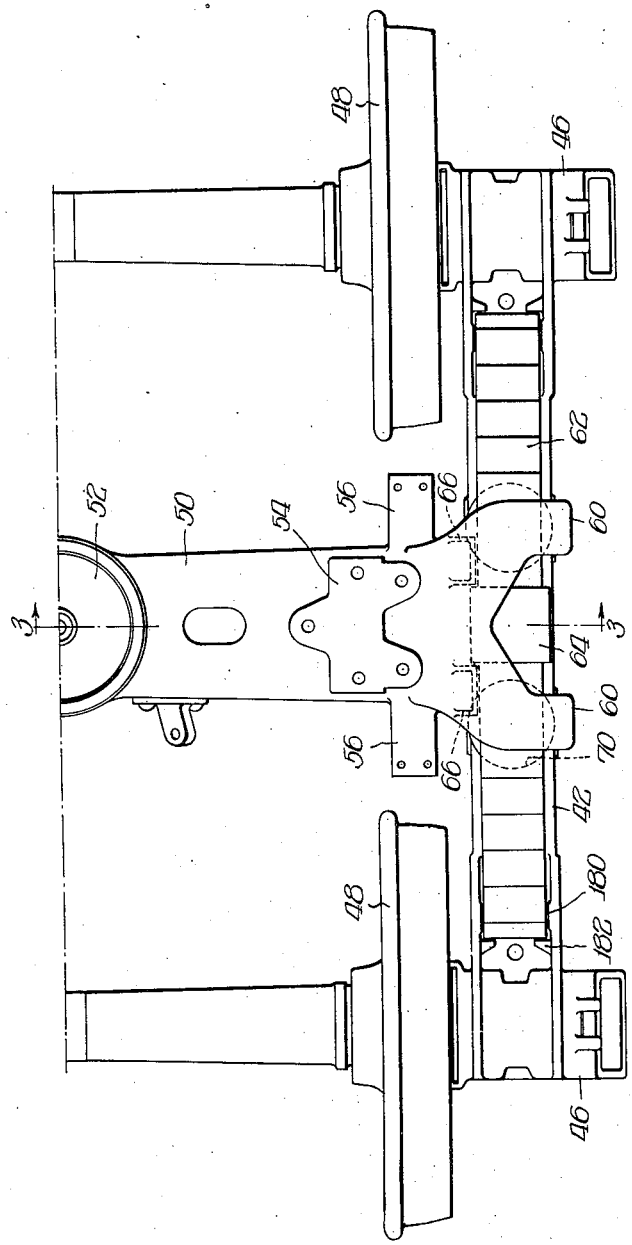

Aug. 18, 1936.  A. H. OELKERS  2,051,649
TRUCK
Filed Feb. 19, 1932  11 Sheets-Sheet 2
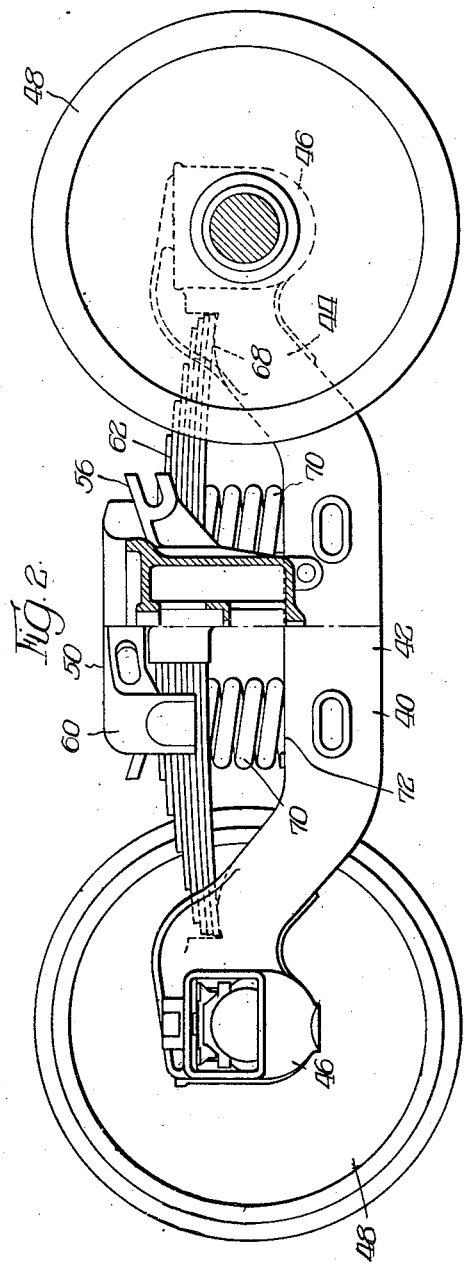
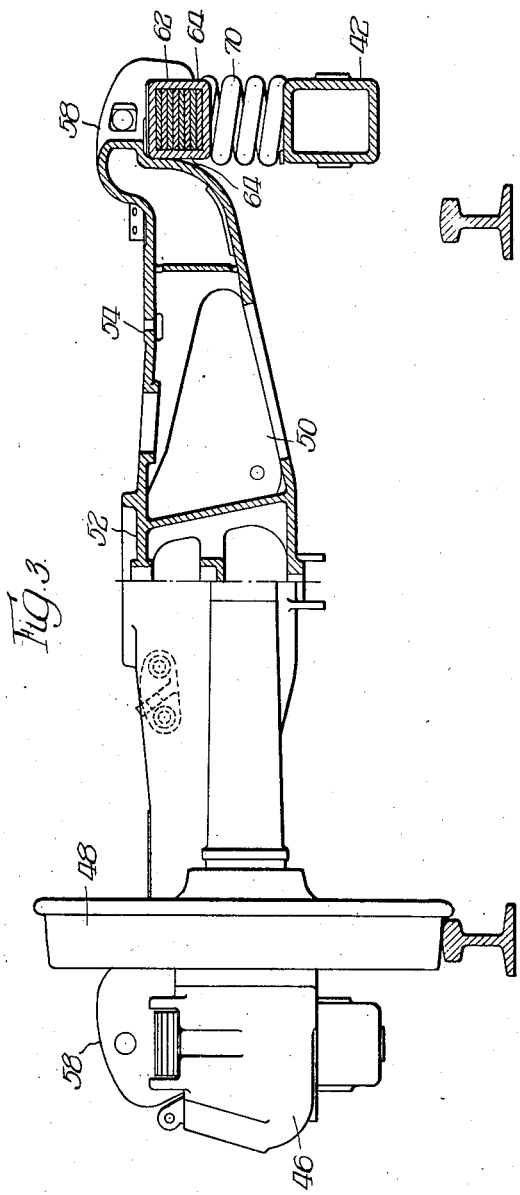
Inventor
Alfred H. Oelkers
By Wilkinson, Huxley, Byron & Knight
Attys.

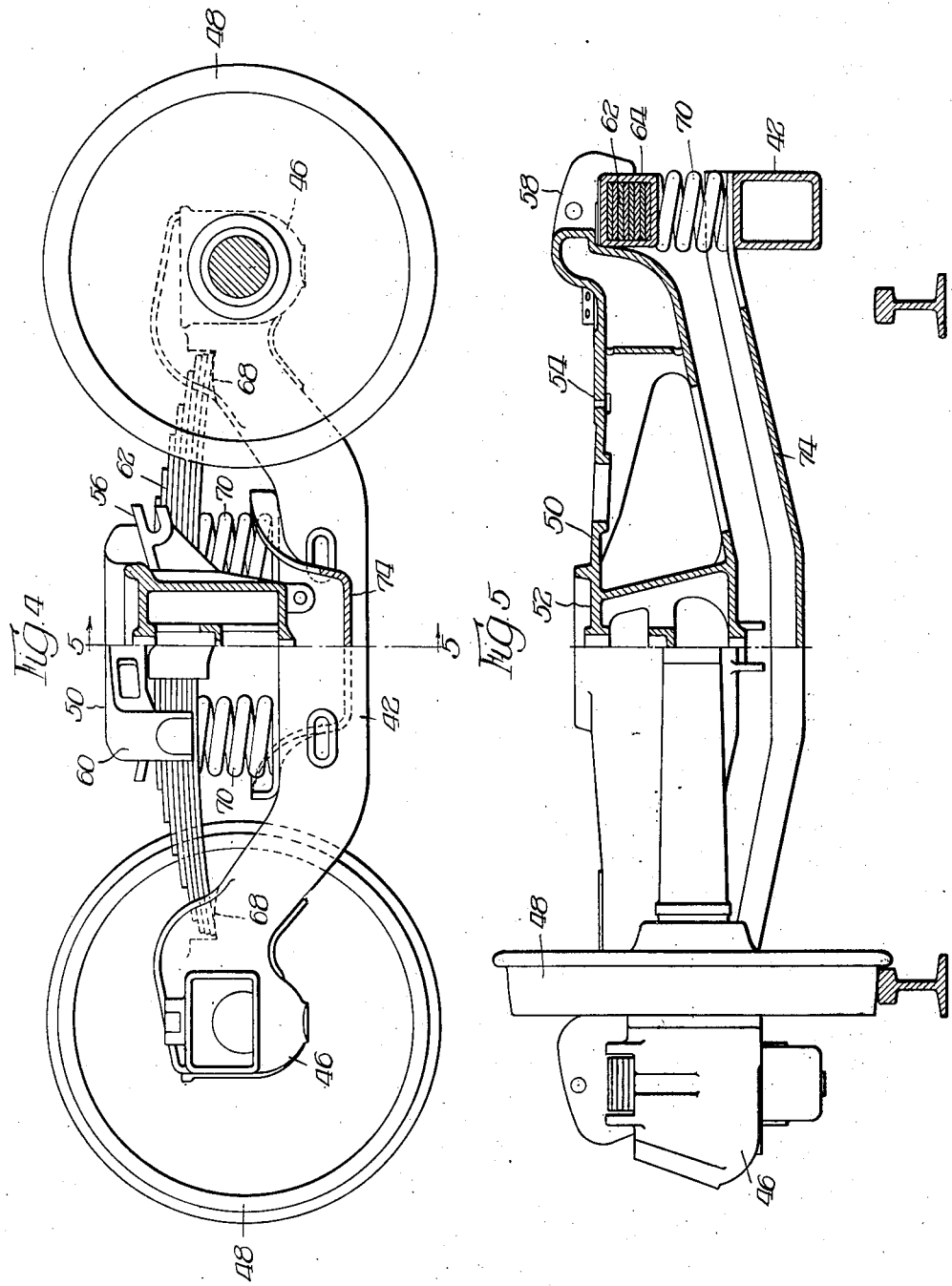

Aug. 18, 1936.  A. H. OELKERS  2,051,649
TRUCK
Filed Feb. 19, 1932   11 Sheets-Sheet 4
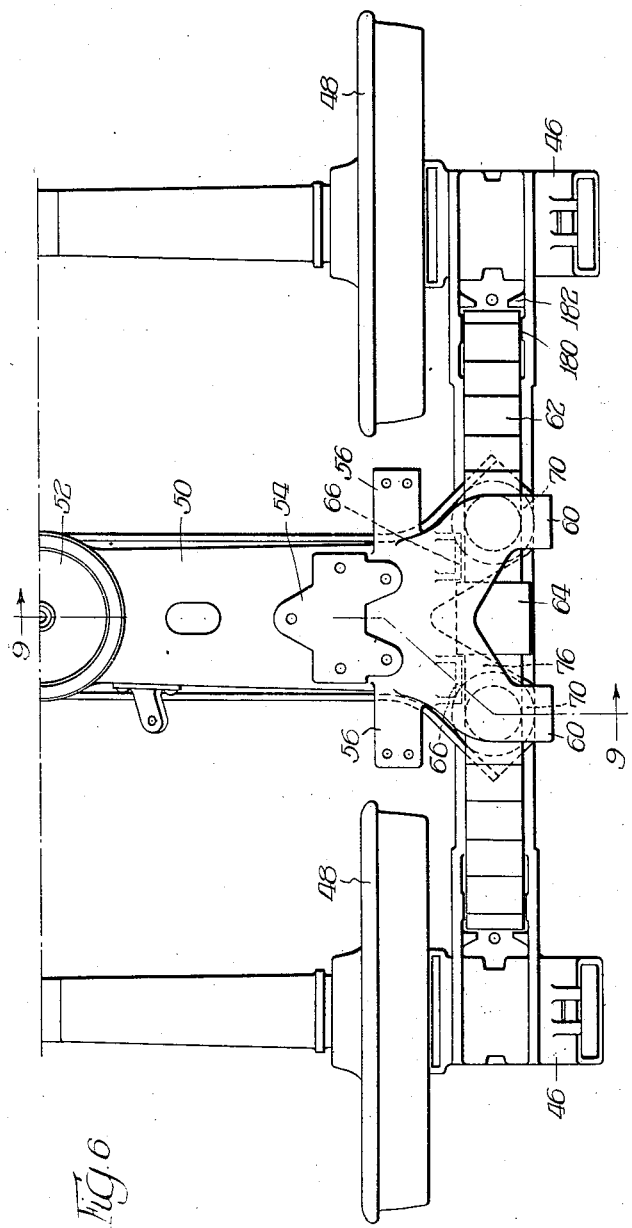
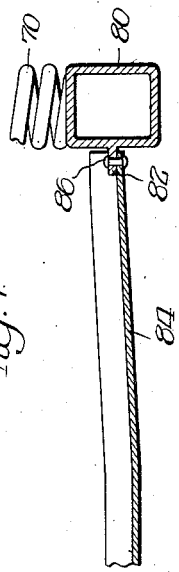
Inventor:
Alfred H Oelkers

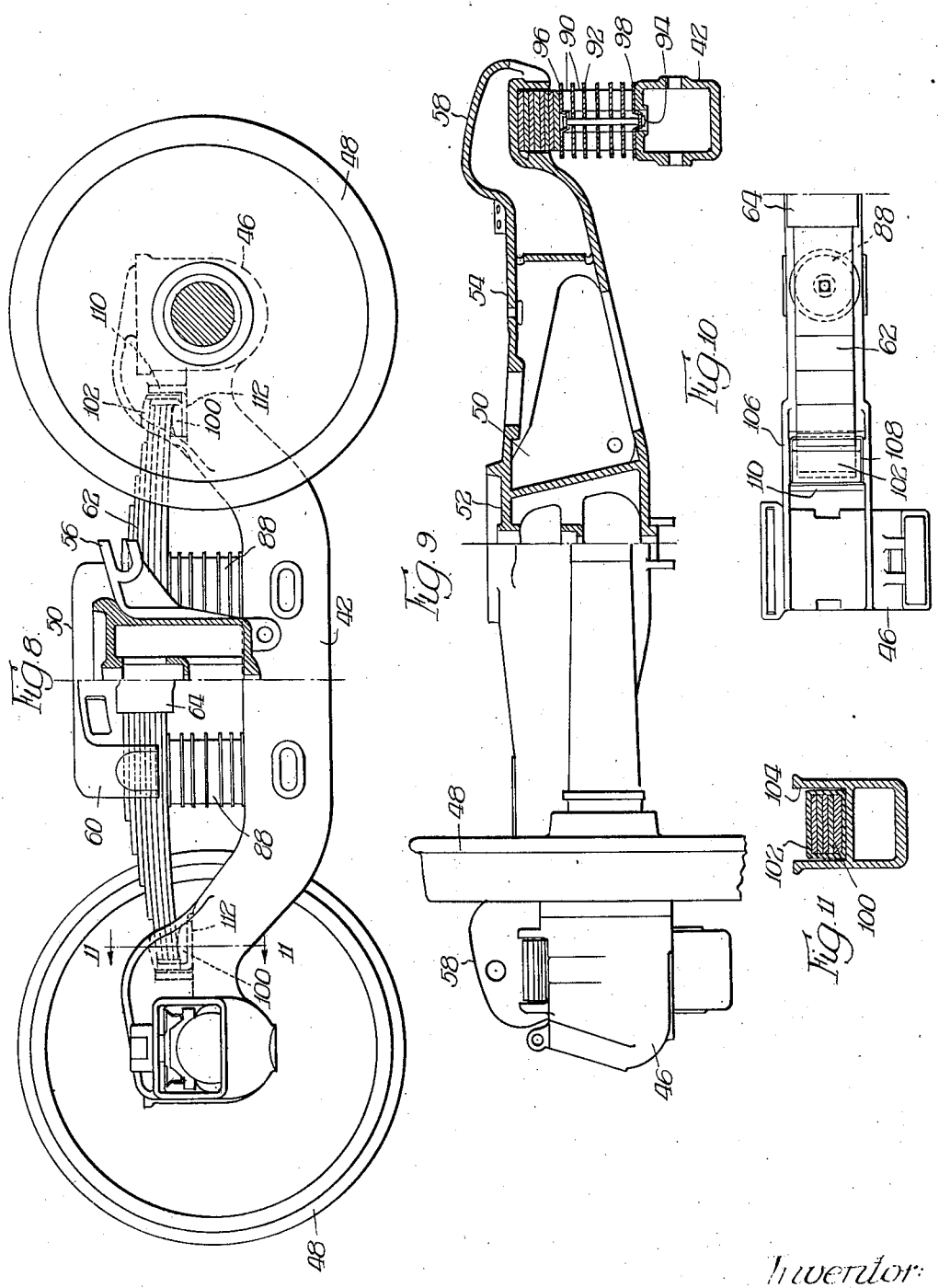

Aug. 18, 1936.  A. H. OELKERS  2,051,649
TRUCK
Filed Feb. 19, 1932   11 Sheets-Sheet 6
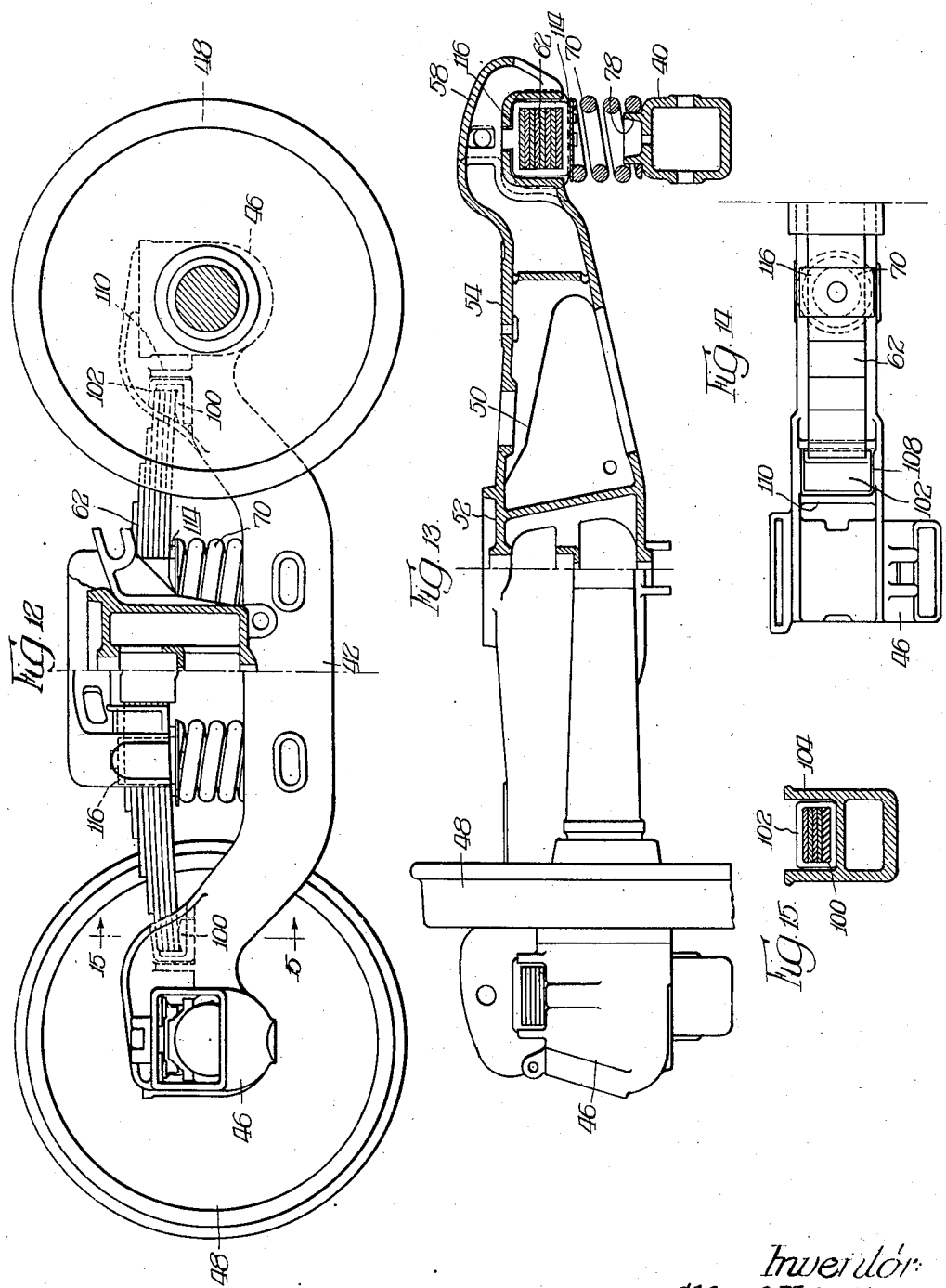
Inventor:
Alfred H Oelkers
By Wilkinson, Huxley, Byron & Knight
Attys

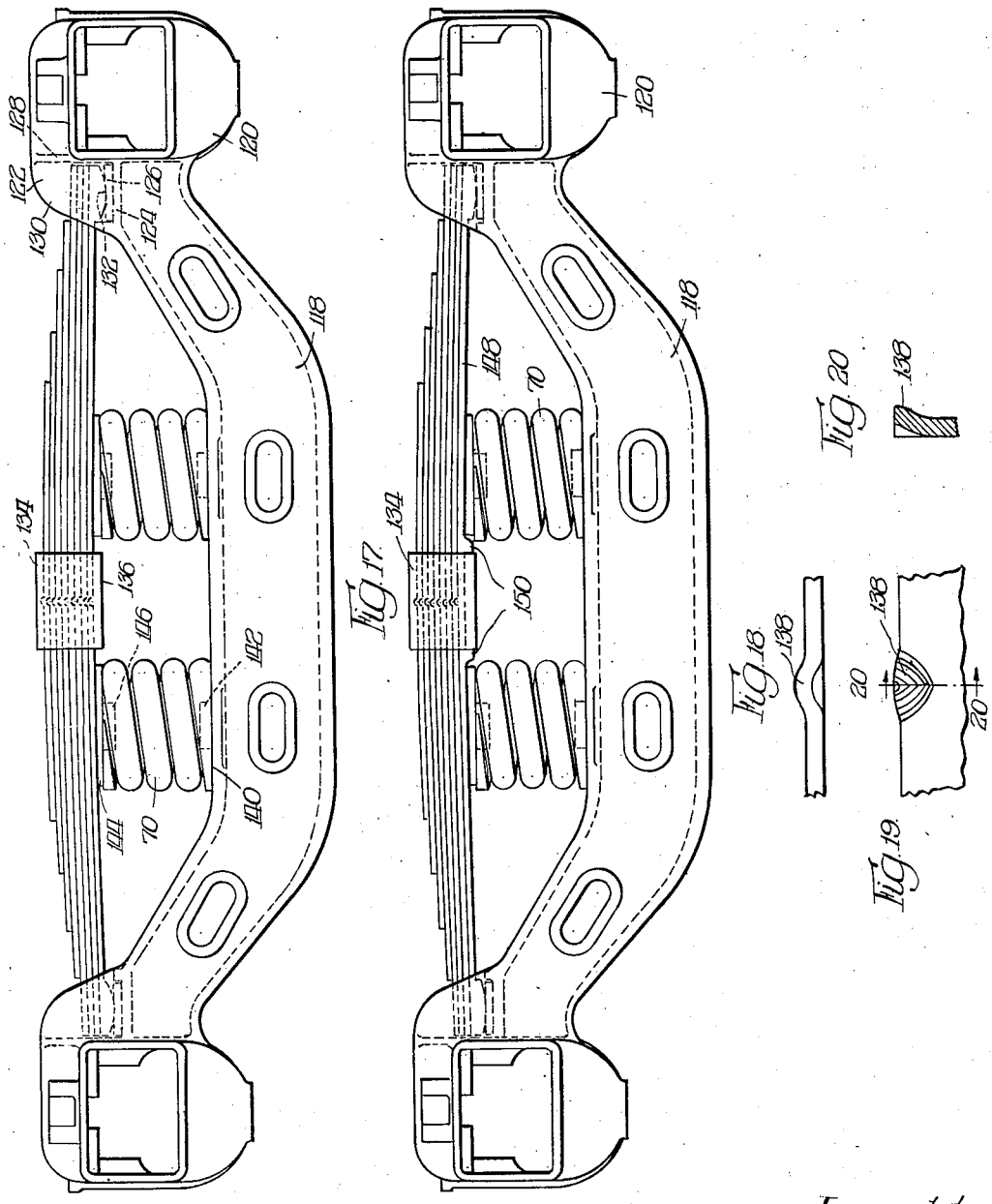

Aug. 18, 1936.　　　A. H. OELKERS　　　2,051,649
TRUCK
Filed Feb. 19, 1932　　　11 Sheets-Sheet 8
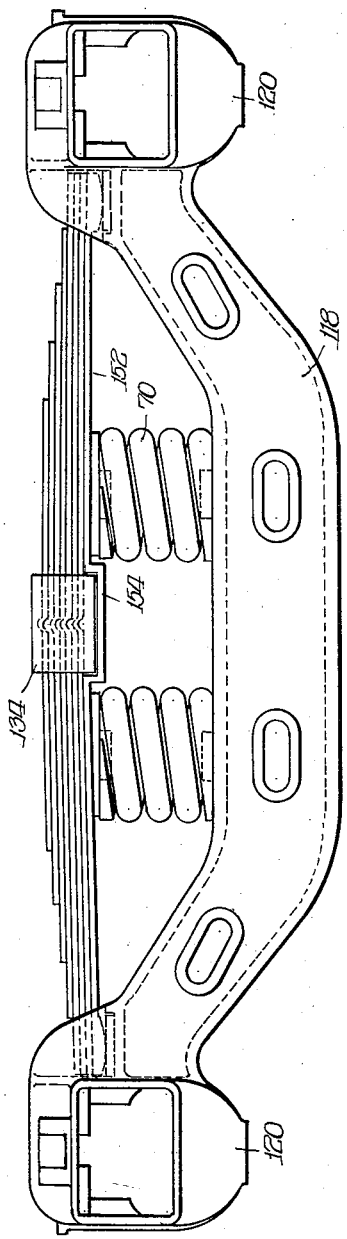
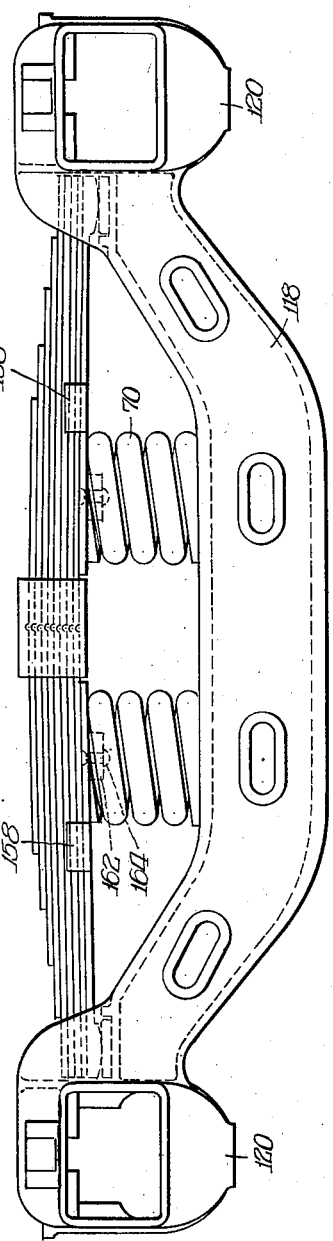
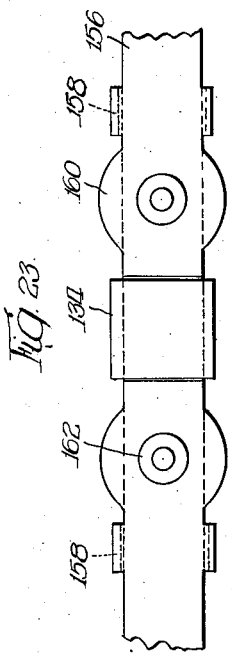
Inventor:
Alfred H. Oelkers Aug. 18, 1936.  A. H. OELKERS  2,051,649
TRUCK
Filed Feb. 19, 1932   11 Sheets-Sheet 9
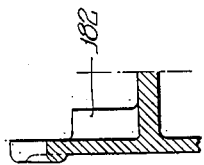
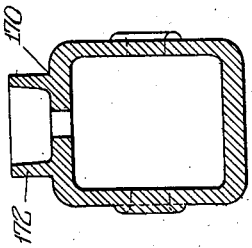
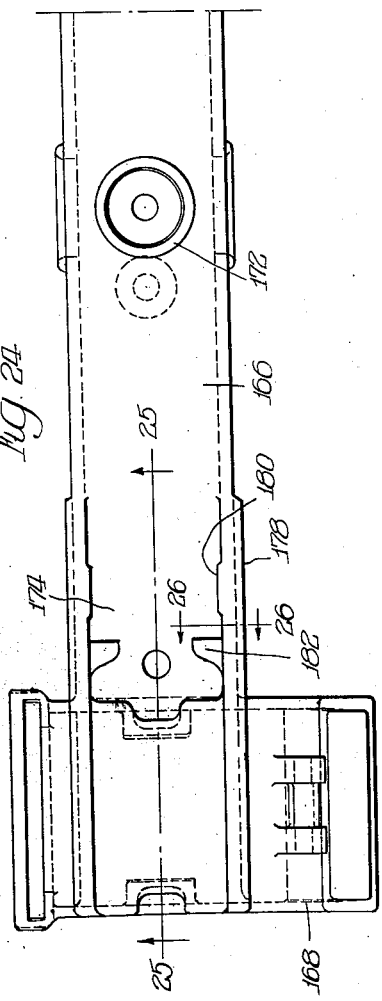
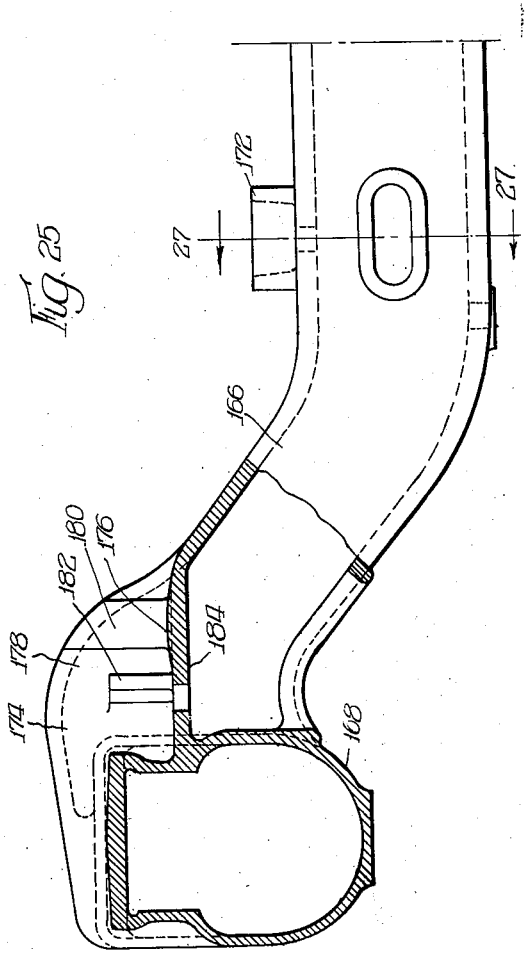
Inventor:
Alfred H. Oelkers Aug. 18, 1936.　　　A. H. OELKERS　　　2,051,649
TRUCK
Filed Feb. 19, 1932　　　11 Sheets-Sheet 10
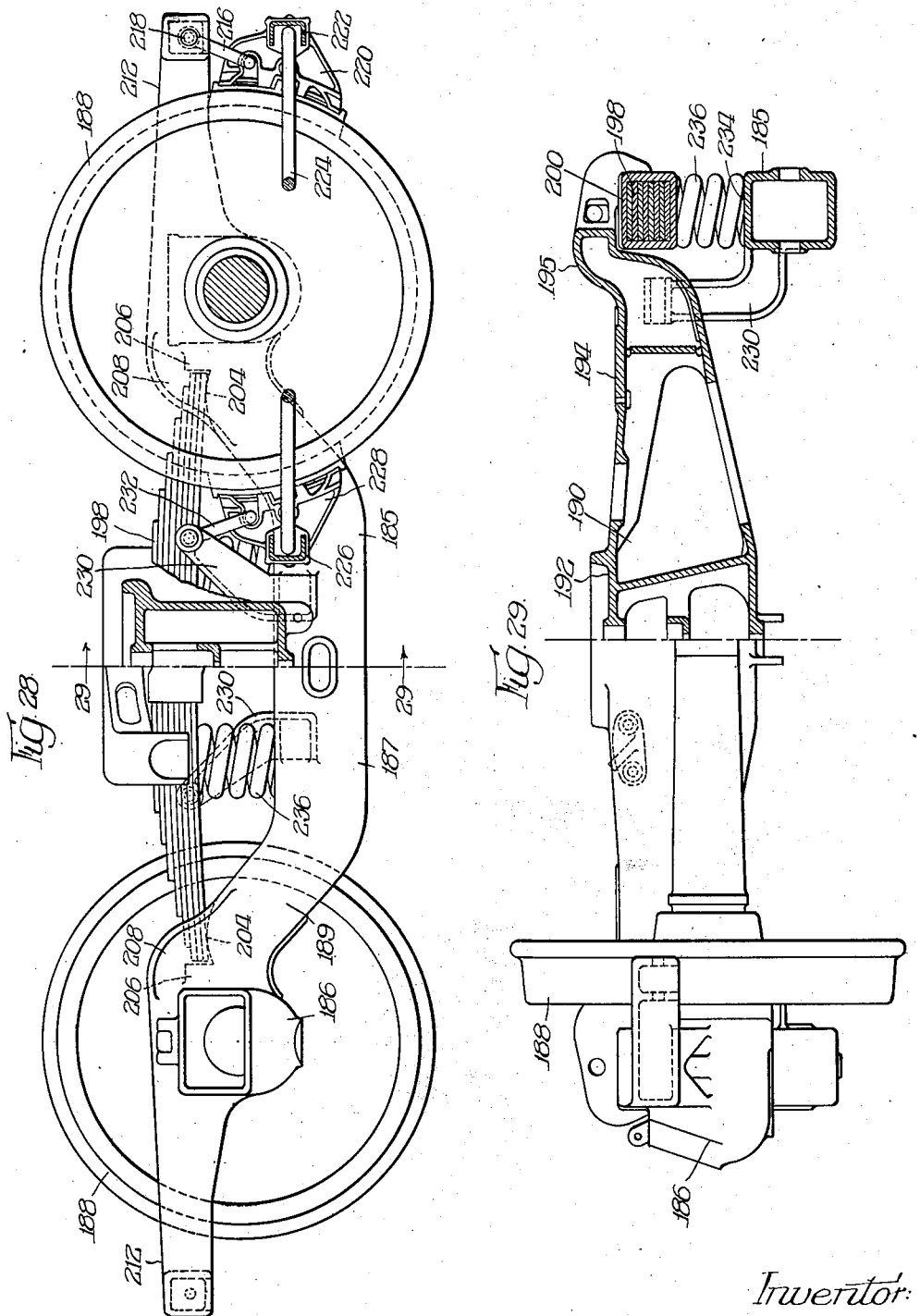
Inventor:
Alfred H. Oelkers Aug. 18, 1936.  A. H. OELKERS  2,051,649
TRUCK
Filed Feb. 19, 1932    11 Sheets-Sheet 11
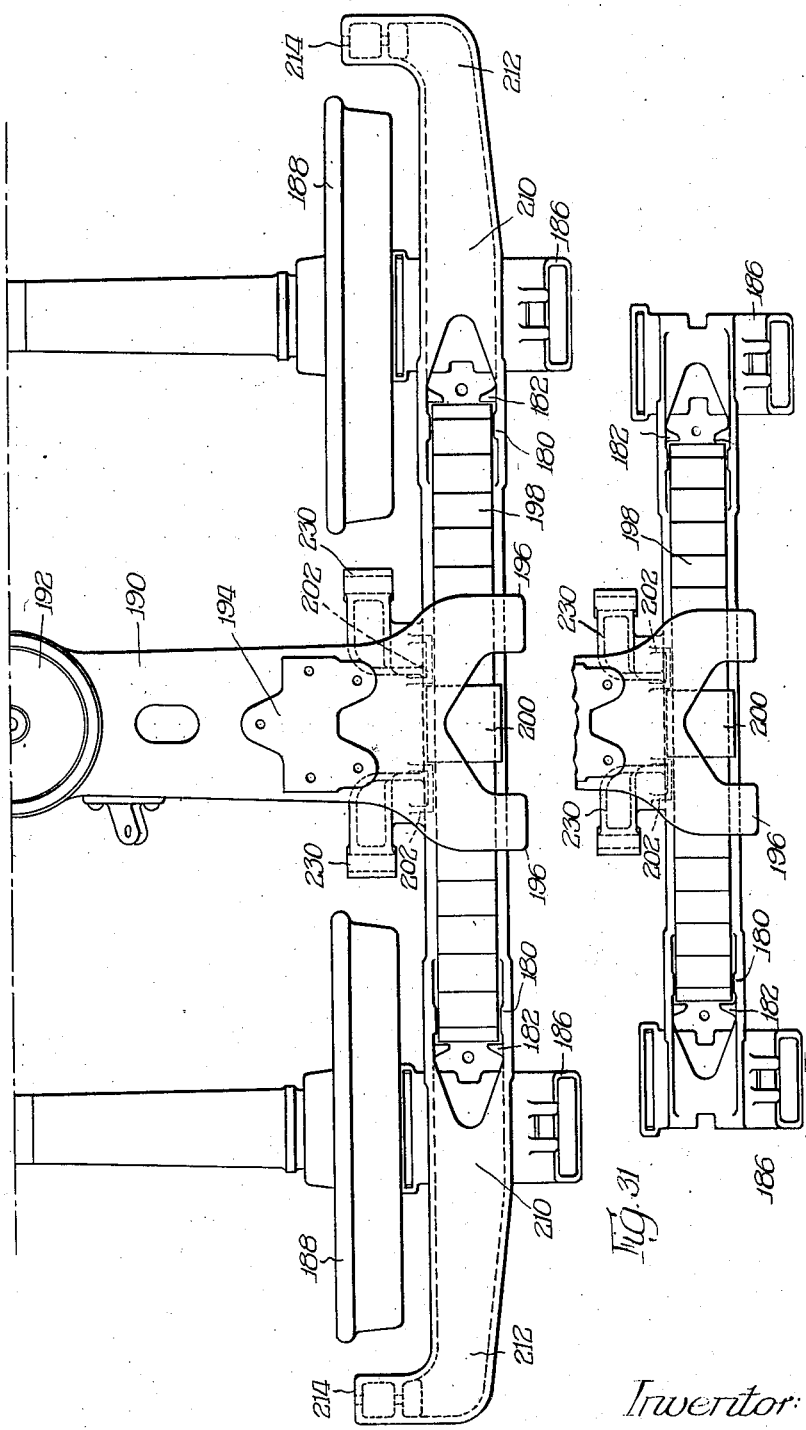

Patented Aug. 18, 1936

2,051,649

UNITED STATES PATENT OFFICE 2,051,649

TRUCK

Alfred H. Oelkers, Chicago, Ill., assignor to American Steel Foundries, Chicago, Ill., a corporation of New Jersey Application February 19, 1932, Serial No. 593,954

112 Claims. (Cl. 105—182)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Yet another object is to provide a truck construction wherein resilient pads are provided for increasing the frictional absorption of certain of the resilient members and/or for dampening out metallic vibrations transmitted through the metallic truck parts, and also for the purpose of deadening noise.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

A still further object is to provide a truck construction wherein the load carrying member is supported on the side frame by resilient members of different characteristics and so arranged that certain of the resilient members increase certain capacities of other resilient members.

Another further object is to provide a truck construction wherein the load carrying member is carried on the side frame by means which varies its effective load transmitting length according to the imposed load.

Yet a further object is to provide a laminated spring arrangement wherein the parts are positively and inherently prevented from dissociation or dislocation.

A different object is to provide a side frame construction of great strength, rigidity and simplicity of construction and design wherein provision is made to position spring members and transmit thrusts therefrom to the side frame.

A still different object is to provide a rigid truck construction embodying each or any of the above advantages and wherein brake supporting means is disposed to permit the application of the truck to cars adapted for use in dumping machines and the like.

With these and various other objects in view the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation, partly in section, of the truck construction shown in Figure 1;

Figure 3 is an end elevation partly in section of the truck construction shown in Figure 1, the section to the right of the figure being taken substantially on the transverse center line of the truck and substantially in the plane as indicated by the line 3—3 of Figure 1;

Figure 4 is a side elevation, partly in section, of a modified form of truck construction embodying the invention;

Figure 5 is an end elevation of the truck construction shown in Figure 4, the section to the right of the figure being taken substantially in the plane as indicated by the line 5—5 of Figure 4;

Figure 6 is a fragmentary top plan view of the truck construction shown in Figures 4 and 5;

Figure 7 is a transverse sectional elevation showing a modified form of spring plank connection as applied to the truck side frame of any of the modifications illustrated herein;

Figure 8 is a side elevation, partly in section, of another modified form of a truck construction embodying the invention;

Figure 9 is a fragmentary sectional end elevation of the truck construction illustrated in Figure 8, the section to the right of the figure being taken substantially in the plane as indicated by the line 9—9 of Figure 6;

Figure 10 is a fragmentary top plan view of the truck construction illustrated in Figures 8 and 9, with the bolster removed;

Figure 11 is a sectional elevation taken substantially in the plane as indicated by the line 11—11 of Figure 8;

Figure 12 is a side elevation partly in section of yet another modified form of a truck construction embodying the invention;

Figure 13 is a fragmentary sectional end elevation of the truck construction illustrated in Figure 12, the section to the right of the figure corresponding substantially to that shown at the right of Figure 9;

Figure 14 is a fragmentary top plan view of the truck construction illustrated in Figures 12 and 13, with the bolster removed;

Figure 15 is a sectional elevation taken substantially in the plane as indicated by the line 15—15 of Figure 12;

Figures 16, 17, 21 and 22 are side elevations of truck constructions embodying the invention, showing modified means for locking the band on the leaf spring;

Figure 18 is a fragmentary side elevation of a spring leaf, showing the interlocking grooved portion;

Figure 19 is a fragmentary top plan view of the spring leaf shown in Figure 18;

Figure 20 is a fragmentary sectional side elevation taken substantially in the plane indicated by the line 20—20 of Figure 19;

Figure 23 is a fragmentary bottom plan view of the leaf spring construction shown in Figure 22;

Figure 24 is a fragmentary top plan view of a form of side frame embodying the invention;

Figure 25 is a fragmentary side elevation, partly in section, of the truck construction shown in Figure 24, the section being taken substantially in the plane as indicated by the line 25—25 of Figure 24;

Figure 26 is a fragmentary sectional elevation taken substantially in the plane as indicated by the line 26—26 of Figure 24;

Figure 27 is a sectional elevation taken substantially in the plane as indicated by the line 27—27 of Figure 25;

Figure 28 is a side elevation partly in section of still another modified form of truck construction embodying the invention, showing the application thereto of clasp brakes;

Figure 29 is an end elevation partly in section of the truck construction shown in Figure 28, the section at the right of the figure being taken substantially in the plane as indicated by line 29—29 of Figure 28;

Figure 30 is a fragmentary top plan view of the structure shown in Figures 28 and 29, with the brakes removed;

Figure 31 is a fragmentary top plan view of a truck construction similar to Figures 28 to 30 inclusive, the side frame being modified to adapt it for use with single brakes.

Referring first of all more particularly to the truck constructions illustrated in Figures 1 to 15 inclusive, the truck side frame 40 is substantially U-shaped in side elevation, being provided with the elongated central portion 42 of substantially box section provided with upwardly extending end portions 44 terminating in axle journal cooperating portions which, in the embodiment illustrated, are the journal boxes 46. This box girder formation of the side frame gives great strength, rigidity and simplicity of construction and design. The journal boxes are provided with the usual brasses and wedges to cooperate with the journal ends of the wheel and axle assemblies 48, it being understood, of course, that any form of wheel and axle assembly may be used, in which case the journal boxes may be modified accordingly.

The bolster 50 is disposed between the spaced truck side frames, and is provided with the center bearing 52 and side bearings 54, and brake hanger brackets 56 are provided disposed substantially in the plane of the wheels. The bolster is widened at its ends 58 and bifurcated, the spaced arms 60 of the bolster forming the bifurcation being yoke shaped and adapted to embrace the longitudinal leaf spring assembly 62. The leaf spring assembly is provided with a central band 64 for maintaining the leaves of the leaf spring assembly in proper relation, one to the other, and the bolster is provided with the spaced lugs 66 embracing or disposed on each side of the spring band 64.

The side frame portion 44 adjacent the journal box is provided with the spring seats 68 adapted to receive the ends of the leaf spring assembly 62, the seats 68 preferably being arcuate or convexed upwardly whereby deflection of the leaf spring will shorten the effective support of the springs. That is, the seats for the elliptic springs are so arranged that when a light load is applied to the springs the distance between the supporting points of the spring will be greater than when a heavy load is applied. It may therefore be said that the convexedly shaped seat of a leaf spring automatically shortens the span, and the load carrying capacity of the leaf spring is increased as the weight to be supported is increased.

The load transferred from the bolster to each spring assembly is carried at two distinct areas on the upper spring leaf, and the major portion of the load at each of said areas is supported directly on the side frame by means of the coil spring assemblies 70 interposed between the lower leaf of the leaf spring assembly 62 and the spring seat 72 provided on the side frame so that only a minor portion of the load is supported at the seats 68 by the stiffness of the leaf spring.

With this arrangement each of the loads transferred at the upper leaf spring areas is directly employed to press the surfaces of the plates together, thus producing a maximum frictional absorption within the plate spring. With such an arrangement a resilient support is provided which inherently absorbs some of the energy of shocks by friction, and this arrangement of the springs herein described, wherein both the advantages of a series and parallel arrangement is obtained, applicant will designate as a series-parallel arrangement.

If coil springs alone are used practically all the energy of shocks is rebounded and a succession of light shocks often causes violent vertical oscillations detrimental to the car body and its lading. When a leaf spring alone is used the violent oscillations are prevented by friction between the spring leaves, but the comparatively large size and great weight of the leaf spring required to obtain resiliency equal to the coil spring is detrimental and undesirable.

With the present series-parallel arrangement of springs, the high capacity of the coil spring is utilized for resiliently carrying the major portion of the load, and at the same time the desirable friction between the surfaces of the plate spring is utilized to absorb a portion of the shock, and thereby prevent oscillation.

With the arrangement shown in Figures 1, 2 and 3, and 8 to 31 inclusive, the drive is through the leaf spring from the bolster to the side frame, the side frames being tied together by means of the bolster cooperating with the leaf spring.

In the construction shown in Figures 4, 5 and 6, the side frames are also tied together by means of the spring plank 74, the spring plank preferably underlying the bolster and being offset downwardly between the side frames to provide proper clearance for the vertical oscillations of the bolster. The spring plank is bifurcated at its ends, the arms 76 thereof preferably extending to form a seat for the coil spring assemblies 70; and, where an upwardly extending positioning dowel 78 is provided as shown in Figure 13, the arms 76 may of course be apertured to embrace said positioning dowel whereby the spring plank is secured to the side frame by means of the coil springs 70 and the positioning dowel. Any desirable alternative positioning means of course may be used.

In the construction shown in Figure 7, the side frame 80 is provided with the inwardly extending flange 82 to which the transverse spring plank 84 may be riveted as at 86, the coil spring assemblies 70 in this case bearing directly on the side frame 80.

In the construction shown in Figures 8, 9 and 10, rubber or other resilient springs 88 may be used in place of the coil spring assembly 70. The resilient springs 88, as shown, are segmental, being formed of rubber cushions or pads 90 spaced by means of the metallic disks 92. The intermediate disks are apertured to loosely embrace the positioning bolt 94 securing the upper and lower disks 96 and 98 to complete the assembly, the upper and lower disks being recessed and disposed so that the upper recess receives the head of the bolt, and the lower recess forming depending positioning means, the positioning means being adapted to be received in a suitable aperture formed in the spring seat portion of the upper chord of the side frame member 42.

Rubber or other resilient pads may be interposed between contacting metallic surfaces to deaden noise and form a resilient connection between adjacent metallic members. In the construction shown in Figures 8 to 15 inclusive the ends of the leaf springs are seated on the metallic shoe 100 provided with the upper arcuate surface whereby a construction similar to and for the same purpose as the spring seat 68 is formed. The end of the leaf spring and the metallic shoe 100 are retained in the resilient sleeve 102 disposed to embrace the end of the leaf spring. The spring seat portion 104 of the side frame in this case is provided with the upwardly extending flanges 106 provided with the positioning pads 108 and a wall 110 connecting said flanges 106. The pocket is completed by the recessed seat portion 112 adapted to receive the sleeve 102 together with the metallic shoe.

The connection between the leaf spring assembly 62 and the side frame in Figures 12 to 15 inclusive, is similar to the construction shown in Figures 8 to 11 inclusive. However, the resilient segmental springs 88 are replaced by the coil spring assemblies 70, which, as already explained, are positioned on the side frame 40 by means of the upwardly extending dowels 78. The coil springs, provided with the rubber or resilient cushion 114, are interposed between the side frame and the leaf spring assembly 62, and a similar resilient cushion 116 is also interposed between the upper leaf of the plate spring and the load carrying surface of the bolster. Of course, the resilient pads may also be interposed between any other adjacent metallic surfaces, the advantage of such pads being that metallic vibrations are absorbed rather than transmitted from the rail to the car body.

In the construction shown in Figures 16 to 23 inclusive, means are shown for locking the band on the leaf spring. In each of the constructions the side frame 118 is similar to the side frame 40, being provided with the journal boxes 120, the spring pocket 122 formed adjacent the journal boxes being provided with the recessed portion 124 for the reception of the wearing pad 126 disposed in said recess, the end wall 128 of said pocket being adjacent the journal box and terminating upwardly either in spaced lugs, or a wall connecting the spaced pocket forming flanges 130. The ends of the lower leaf are provided with the arcuate bearing portions 132 engaging the wear pads 126.

In each of the spring constructions shown adjacent leaves are center grooved and are inter fitted as at 134, the assembly being completed by the spring band 136 embracing the leaves of the spring and being correspondingly grooved so that the spring band interfits with upper and lower plates of the leaf spring assembly. In the detail of spring grooving shown in Figures 18 to 20 inclusive, the edges of the plate springs are grooved or crimped as shown at 138. It will of course be understood that similar constructions may be used, such as a completed boss or rib formed adjacent the center of the plates or extending completely across the plates. The coil springs 70 in each of the modifications are seated on the spring seat 140 provided on the side frame and embrace the positioning dowel 142, the metallic or resilient upper seat 144 being interposed between the coil springs 70 and the lower plate of the leaf spring assembly, the positioning dowel 146 serving to position the seat 144 on the coil spring.

In the construction shown in Figure 17 the lower plate 148 of the leaf spring assembly is provided with spaced lugs 150 adapted to abut and position the spring band 134. In the construction illustrated in Figure 21 the lower plate 152 of the leaf spring assembly is joggled or offset at 154 to embrace the spring band 134. In the construction shown in Figure 22 the lower member of the leaf spring assembly is sectionalized or made in a plurality of parts 156 terminating adjacent the spring band 134 so that the inner edges of the lower plate portions 156 abut the spring band for positioning it. Intermediate the length of the spring portions 156 upwardly extending flanges or lugs 158 are provided embracing the sides of the leaf spring assembly, and enlarged spring seat portions 160 may also be provided on the plate portions, coil spring positioning dowels 162 being riveted thereto as at 164.

In the side frame shown in Figures 24 to 27 inclusive, the construction is similar to that as already described for the side frame 40. More specifically, in this case the side frame 166 is of box girder construction between the journal boxes to provide greater strength, rigidity and simplicity in design and construction, as shown at section 27—27 of Figure 25; the side frame being substantially U-shaped in side elevation and being provided with any suitable journal box constructions 168. Coil spring seats are provided at 170, the positioning dowels 172 being provided for the reception of the coil springs. A spring pocket 174 is provided for the reception of the ends of the leaf spring assemblies, the pocket being either recessed for the reception of a wear pad as shown in Figures 16 to 22 inclusive, or provided with the upwardly convexed or arcuate spring seat portion 176 disposed between the spaced flanges 178 forming the pocket, the flanges extending upwardly and merging into the outer corner of the journal box. Inwardly extending positioning pads 180 are provided on the side flanges adjacent the spring seat portion 178 for preventing side movement of the leaf spring assemblies, and the assemblies are positioned lengthwise and transfer any end thrust lengthwise by means of the spaced lugs 182 formed integral with the side flanges 178 and the bottom chord 184 of the pocket 174.

Referring now more particularly to the truck constructions shown in Figures 28 to 31 inclusive, forms of trucks are shown adapted to support clasp brakes or brakes between the wheels, the latter being illustrated in Figure 31. As before, the truck side frame 185 is substantially U-shaped in side elevation, being provided with the elongated central portion 187 of substantially box section provided with upwardly extending end portions 189 having the journal boxes 186 adapted to cooperate with the journal ends of the wheel and axle assemblies 188. The bolster 190 is disposed between the spaced truck side frames and is provided with the center bearing 192 and the side bearings 194. The bolster is provided with bifurcated ends 195, the spaced arms 196 thereof, forming the bifurcation, being yoke shaped and adapted to embrace the longitudinal leaf spring assembly 198.

The leaf spring assembly is provided with the central band 200 for maintaining the leaves of the leaf spring assembly in proper relation, one to the other, and the bolster is provided with the spaced lugs 202 disposed on each side of the spring band for positioning the bolster with respect to the leaf spring assembly. The side frame portion 189 adjacent the journal box is provided with the spring seats 204 adapted to receive the ends of the leaf spring assembly 198, the seats being preferably arcuate or convexed upwardly as has been described, and the end lugs 206 formed integral with the pocket forming flanges or walls 208 being provided for end thrust or positioning purposes.

In the construction shown in Figures 28, 29 and 30, the flanges 208 merge to form an end box girder construction 210 which is extended beyond the journal box to form the brake hanger bracket 212, said bracket being provided with the inwardly extending brake hanger support 214 disposed whereby the brake hanger 216 may be pivoted thereto as at 218 substantially in the plane of the wheels of the wheel and axle assemblies 188. The brake hanger 216 is pivoted to the brake shoe 220, which shoe may be provided on the brake beam 222, the brake beam 222 being linked through suitable means 224 to the brake beam 26 disposed on the opposite side of the wheel. The brake beam 226 is provided with the brake shoe 228, said brake shoe 228 being secured to the brake hanger bracket 230 by means of the brake hanger 232. The brake hanger bracket 230 is preferably formed on the inner web of the side frame 185, and extends inwardly and upwardly and toward the respective axle to form a proper pivotal connection for the brake hanger 232 whereby the brake hanger is disposed substantially in the plane of the wheel. The brake hanger bracket 230 is disposed on the inner web of the side frame in such a manner that it does not interfere with the spring seat 234. The coil springs 236 are seated on the spring seats 234, and engage the underside of the leaf spring assemblies 198 in a manner and for the purpose already described. Although no spring plank has been described, it will of course be understood that one may be provided which easily interfits with the spring brackets 230 which may serve as a securing means, either primary or supplementary therefor.

In the construction illustrated in Figure 31 the parts are exactly the same as described for Figures 28 to 30 inclusive, with the exception that the spaced flanges 208 defining the sides of the spring pocket terminate at the journal box and are not extended to provide a brake hanger bracket. The brake hanger brackets 230, however, are provided for receiving the brake hangers or brakes disposed between the wheels, and are of the same construction as the brake hanger brackets shown in Figures 28 to 30 inclusive.

With truck construction such as illustrated in the present application, and particularly as shown in Figures 16 to 23 inclusive, there is provided what may be termed a flexible side frame construction wherein the member 118 integrally connecting the journal boxes 120 is in effect a rigid tension member, whereas the leaf springs 146 disposed between the journal boxes and closely adjacent thereto may be termed the compression member, particularly in view of the fact that it also serves to transmit the end thrusts of the bolster. The direct support in this truck, as well as in the conventional types of truck, is principally through the coil springs 70. The flexible compression member serves merely as a supplementary support and a friction member, as well as an end thrust member. This makes a very advantageous sort of construction, as the principal support 70 serves as a support and also as means, with the bolster, for increasing the friction absorption between the leaves of the compression member, the compression member serving a plurality of functions in that itself a compression member, it serves as a resilient means as well as a frictional means, and imparts end thrust as well as performing a supporting function.

With the forms of truck constructions illustrated, it will be appreciated that the trucks have easy riding qualities, are inexpensive to make and maintain, and it is understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a truck, the combination of a side frame, spaced wheel and axle assemblies associated therewith, a bolster, a resilient member between said bolster and said side frame and engaging said bolster, and means on said side frame of a different character than said resilient member and cooperating with said resilient member to load said resilient member to thereby increase the amount of energy said resilient member will absorb.

2. In a truck, the combination of a side frame, spaced wheel and axle assemblies associated therewith, a bolster, a resilient member between said bolster and said side frame and engaging said bolster, and resilient means on said side frame of a different character than said resilient member and cooperating with said resilient member to load said resilient member to thereby increase the amount of energy said resilient member will absorb.

3. In a truck, the combination of a side frame, spaced wheel and axle assemblies associated therewith, a bolster, a resilient member between said bolster and said side frame and engaging said bolster, and means directly cooperating with said resilient member and said side frame to load said resilient member to thereby increase the amount of energy said resilient member will absorb.

4. In a truck, the combination of a side frame, spaced wheel and axle assemblies associated therewith, a bolster, a resilient member between said bolster and said side frame and engaging said bolster, and resilient means directly cooperating with said resilient member and said side frame to load said resilient member to thereby increase the amount of energy said resilient member will absorb.

5. In a truck, the combination of spaced wheel and axle assemblies, members disposed between and cooperating with said assemblies, said members including a flexible member, a rigid member and a bolster, said bolster engaging one of said last named members, and resilient means disposed between certain of said last named members and intermediate the ends thereof.

6. In a truck, the combination of spaced wheel and axle assemblies, members disposed between and cooperating with said assemblies, said members including a flexible member, a rigid member and a bolster, said bolster engaging one of said last named members, and resilient means disposed between and constantly engaging said flexible and rigid members and intermediate the ends thereof.

7. In a truck, the combination of spaced wheel and axle assemblies, members disposed between and cooperating with said assemblies, said members including a substantially flat upper flexible and a lower rigid member, and a bolster having a portion disposed above and supported on said flexible member, said bolster being freely spaced with respect to said rigid member.

8. In a truck, the combination of spaced wheel and axle assemblies, members disposed between and cooperating with said assemblies, said members including a substantially flat upper flexible and a lower rigid member, a bolster supported on and engaging said flexible member, and resilient means disposed between said flexible and rigid members and intermediate the ends thereof.

9. In a car truck, the combination of a side frame, a bolster, a leaf spring extending longitudinally of said side frame and being disposed between said side frame and said bolster, said spring being unconfined between the ends thereof and having abutment means thereon, said bolster being provided with means embracing said abutment means whereby stresses longitudinally of said truck are transmitted between said bolster and said side frame.

10. In a truck, the combination of a side frame, spaced wheel and axle assemblies associated therewith, a bolster, a longitudinally disposed leaf spring between said bolster and said side frame, spaced coil springs between said leaf spring and side frame, said bolster being provided with portions for transmitting the load to said leaf spring, said portions being aligned substantially with said coil springs, and brake hanger brackets disposed substantially in the plane of said wheels.

11. In a bolster, the combination of spaced tension and compression members, bearings formed on said compression member, the ends of said bolster having U-shaped portions for embracing a spring assembly on opposite sides of a spring band cooperating therewith.

12. In a bolster, the combination of spaced tension and compression members, bearings formed on said compression member, the ends of said bolster having inverted U-shaped portions for embracing a leaf spring assembly on opposite sides of a spring band cooperating therewith.

13. In a bolster, the combination of spaced tension and compression members, bearings formed on said compression member, the ends of said bolster having spaced U-shaped portions for embracing a spring assembly on opposite sides of a spring band cooperating therewith.

14. In a bolster, the combination of spaced tension and compression members, bearings formed on said compression member, the ends of said bolster having spaced U-shaped portions for embracing a leaf spring assembly on opposite sides of a spring band cooperating therewith.

15. In a bolster, the combination of spaced tension and compression members, bearings formed on said compression member, the ends of said bolster having spaced U-shaped portions for embracing a spring assembly, said portions being spaced apart to accommodate a spring band for said spring assembly.

16. In a bolster, the combination of spaced tension and compression members, bearings formed on said compression member, the ends of said bolster having spaced U-shaped portions for embracing a leaf spring assembly, said portions being spaced apart to accommodate a spring band for said spring assembly.

17. In a bolster, the combination of spaced tension and compression members, bearings formed on said compression member, the ends of said bolster having U-shaped portions for embracing a spring assembly, and means on said bolster for positioning said bolster against movement on said spring assembly longitudinally thereof.

18. In a bolster, the combination of spaced tension and compression members, bearings formed on said compression member, the ends of said bolster having spaced U-shaped portions for embracing a leaf spring assembly, said portions being spaced apart to accommodate a spring band for said spring assembly, and means on said bolster for positioning said bolster on said spring assembly.

19. In a bolster, the combination of spaced tension and compression members, bearings formed on said compression member, the ends of said bolster having U-shaped portions for embracing a spring assembly, and brake hanger brackets disposed on said bolster, said U-shaped portions being spaced apart to accommodate a spring band for said spring assembly, and means on said bolster for positioning said bolster on said spring assembly.

20. In a bolster, the combination of spaced tension and compression members, bearings formed on said compression member, the ends of said bolster having U-shaped portions for embracing a spring assembly, and brake hanger brackets disposed on said bolster inwardly of said U-shaped portions, said U-shaped portions being spaced apart to accommodate a spring band for said spring assembly, and means on said bolster for positioning said bolster on said spring assembly.

21. In a truck, the combination of a side frame, spaced wheel and axle assemblies associated therewith, a bolster, a longitudinally disposed leaf spring between said bolster and side frame, spaced coil springs between said side frame and bolster, said bolster being provided with portions for transmitting the load to said leaf spring, said portions being aligned substantially with said coil springs.

22. In a truck, the combination of a side frame, spaced wheel and axle assemblies associated therewith, a bolster, a longitudinally disposed leaf spring between said bolster and side frame, spaced coil springs between said side frame and bolster, said bolster being provided with portions for transmitting the load to said leaf spring, said portions being aligned substantially with said coil springs, said bolster being provided with brake hanger brackets disposed substantially in the plane of said wheels.

23. In a truck, the combination of a side frame, spaced wheel and axle assemblies and a spring plank associated therewith, a bolster, a resilient member between said bolster and said side frame, and means on said spring plank cooperating with said resilient member to load said resilient member to thereby increase the amount of energy said resilient member will absorb.

24. In a side frame member having axle cooperating means, spring seats disposed adjacent said means, spring seats disposed between said first named seats, and a flange disposed on said member between pairs of said seats for accommodating a spring plank.

25. In a side frame member having axle cooperating means, spring seats disposed adjacent said means, spring seats disposed between said first named seats, and a flange disposed on said member between said last named seats for accommodating means for squaring said side frame member with a spaced side frame member.

26. In a truck, the combination of a side frame, spaced wheel and axle assemblies associated therewith, a load carrying member, a resilient member between said load carrying member and said side frame, and a resilient cushion including resilient pads cooperating with said resilient member to thereby increase the amount of energy said resilient member will absorb.

27. In a truck, the combination of a side frame, spaced wheel and axle assemblies associated therewith, a load carrying member, a resilient member between said load carrying member and said side frame, a resilient cushion and a coil spring cooperating with said resilient member to thereby increase the amount of energy said resilient member will absorb.

28. In a truck, the combination of a side frame provided with journal boxes having cooperative engagement with wheel and axle assemblies, a bolster, spring seats adjacent said journal boxes, a longitudinally disposed leaf spring supporting said bolster through engagement therewith, said spring being supported by said spring seats, and a coil spring interposed between said side frame and said leaf spring whereby the load is supported to substantially a greater extent by said coil spring.

29. In a truck, the combination of a side frame provided with journal boxes having cooperative engagement with wheel and axle assemblies, a bolster, spring seats adjacent said journal boxes, a longitudinally disposed leaf spring supporting said bolster through engagement therewith, said spring being supported by said spring seats, and resilient means interposed between said side frame and said leaf spring whereby the load is supported to substantially a greater extent by said resilient means.

30. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and a resilient cushion interposed between said side frame and said leaf spring whereby the load is supported to substantially a greater extent by said resilient cushion.

31. In a truck, the combination of a side frame provided with journal boxes having cooperative engagement with wheel and axle assemblies, a bolster, spring seats adjacent said journal boxes, a longitudinally disposed leaf spring supporting said bolster through engagement therewith, said spring being supported by said spring seats, and a coil spring interposed between said side frame and bolster whereby the load is supported to substantially a greater extent by said coil spring.

32. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and a resilient cushion interposed between said side frame and bolster whereby the load is supported to substantially a greater extent by said resilient cushion.

33. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and a nest of resilient cushion members interposed between said side frame and bolster whereby the load is supported to substantially a greater extent by said cushion members.

34. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and a nest of resilient cushion members interposed between said side frame and leaf spring whereby the load is supported to substantially a greater extent by said cushion members.

35. In a truck, the combination of a side frame provided wth journal boxes having cooperative engagement with wheel and axle assemblies, a bolster, spring seats adjacent said journal boxes, a longitudinally disposed leaf spring supporting said bolster, said spring being supported by said spring seats, a coil spring interposed between said side frame and bolster whereby the load is supported to substantially a greater extent by said coil spring, and a resilient cushion interposed between said coil spring and bolster.

36. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, a coil spring interposed between said side frame and bolster whereby the load is supported to substantially a greater extent by said coil spring, and a resilient cushion interposed between said coil spring and leaf spring.

37. In a car truck, the combination of a side frame having journal boxes cooperating with wheel and axle assemblies, a load carrying member having a center bearing, fixed seat members on said side frame adjacent said journal boxes, friction means engaging said seats and supporting said load carrying member by engagement therewith, and resilient means of different character than said friction means interposed between said friction means and side frame.

38. In a car truck, the combination of a side frame having journal boxes cooperating with wheel and axle assemblies, a bolster, fixed seat members on said side frame adjacent said journal boxes, friction means engaging said seats and supporting said bolster by engagement therewith, and resilient means of different character than said friction means interposed between said bolster and side frame.

39. In a car truck, the combination of a side frame, a bolster and a leaf spring interposed in supporting relation between said bolster and side frame and including flexible leaf spring members having interlocking means and a band embracing a portion of said members adjacent said interlocking means, the base of said spring assembly including spaced members for positioning said band, said spaced members being provided with spring seat portions.

40. In a car truck, the combination of a side frame, a bolster and a leaf spring interposed in supporting relation between said bolster and side frame and including flexible leaf spring members having interlocking means and a band embracing a portion of said members adjacent said interlocking means, the base of said spring assembly including spaced members for positioning said band, said spaced members being provided with coil spring seat portions adjacent said band.

41. A side frame consisting of a single beam member having journal boxes and being offset downwardly therebetween, spring seat members for taking vertical and lateral loads disposed directly on said member adjacent said journal boxes and spaced therefrom, and a spring seat on said side frame intermediate said first named spring seats.

42. A side frame consisting of a single beam member having journal boxes and being offset downwardly therebetween, spring seat members for taking vertical and lateral loads disposed directly on said member adjacent said journal boxes and spaced therefrom, said first named member having portions overlying said journal boxes, and a spring seat on said side frame intermediate said first named spring seats.

43. A side frame including a member having journal boxes and being offset downwardly therebetween, spring seat members for taking vertical and lateral loads disposed on said member adjacent said journal boxes and spaced therefrom, said first named member having spaced flanges defining said spring seats, an end abutment member connecting said spaced flanges adjacent said journal boxes, and a spring seat on said side frame intermediate said first named spring seats.

44. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having spaced brake hanger brackets between said journal boxes, whereby said brake hanger brackets extend to support associated brake rigging in the plane of an associated wheel.

45. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket disposed between said journal boxes, whereby said brake hanger bracket extends to support associated brake rigging in the plane of an associated wheel.

46. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket disposed between said journal boxes and extending to one side of said member, whereby said brake hanger bracket extends to support associated brake rigging in the plane of an associated wheel.

47. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket disposed between said journal boxes and extending to one side of said member and toward a journal box, whereby said brake hanger bracket extends to support associated brake rigging in the plane of an associated wheel.

48. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket disposed between said journal boxes and extending upwardly and to one side of said member, whereby said brake hanger bracket extends to support associated brake rigging in the plane of an associated wheel.

49. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket disposed between said journal boxes and extending upwardly and to one side of said member and toward a journal box, whereby said brake hanger bracket extends to support associated brake rigging in the plane of an associated wheel.

50. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket formed adjacent one of said journal boxes, whereby said brake hanger bracket extends to support associated brake rigging in the plane of an associated wheel.

51. A side frame consisting solely of a single member constituting the tension and compression members of said side frame, said member having journal boxes and being offset downwardly therebetween, spring seat members disposed on said member adjacent said journal boxes and spaced therefrom, and a spring seat between said first-named spring seat members, said first named member having a brake hanger bracket disposed between said journal boxes and extending upwardly and to one side of said member and toward a journal box, said bracket being adapted to be disposed on one side of a car wheel, and said first named member having a brake hanger bracket adapted to be dispose on the opposite side of said car wheel whereby said brake hanger bracket extends to support associated brake rigging in the plane of said wheel.

52. A side frame consisting solely of a member having journal boxes and being offset downwardly therebetween, and spring seat members disposed on said member adjacent said journal boxes and spaced therefrom, said first named member being provided with end thrust means at said seat members.

53. A side frame consisting of a member having journal boxes and being offset downwardly therebetween, and spring seat members disposed on said member adjacent said journal boxes and spaced therefrom, said first named member being provided with spaced end thrust means at each of said seat members.

54. A side frame consisting of a member having journal boxes and being offset downwardly therebetween, and spring seat members disposed on said member adjacent said journal boxes and spaced therefrom, said first named member being provided with end thrust lugs at each of said seat members.

55. A side frame consisting of a member having journal boxes and being offset downwardly therebetween, and spring seat members disposed on said member adjacent said journal boxes and spaced therefrom, said first named member being provided with end thrust lugs at each of said seat members and spaced from said journal boxes.

56. In a car truck, a side frame, a bolster, and differential resilient means between said bolster and said side frame, the parts of said differential means being of different character and cooperating with each other to increase the amount of frictional energy absorption of said means, a portion of said differential means being disposed substantially in the plane of said side frame and engaging said bolster.

57. In a car truck, a side frame, a bolster spaced from said side frame, a leaf spring having a spring band, said spring being carried on said side frame at spaced points and directly supporting and engaging said bolster at points spaced from said spring band.

58. In a car truck, a side frame, a bolster spaced from said side frame, a leaf spring having a spring band, said spring being carried on said side frame at spaced points and directly supporting and engaging said bolster at spaced points intermediate said first named points.

59. In a car truck, a side frame, a bolster, a resilient member carried on said side frame at spaced points and directly supporting said bolster at intermediate spaced points, and resilient means cooperating with said resilient member to increase its energy absorption.

60. In a car truck, a side frame, a bolster, a resilient member carried on said side frame and disposed longitudinally thereof and directly supporting said bolster, and resilient means cooperating with said resilient member to increase its energy absorption.

61. In a car truck, a side frame, a bolster, a resilient member carried on said side frame at spaced points and directly supporting said bolster at intermediate spaced points, and resilient means cooperating with said resilient member and said side frame to increase its energy absorption.

62. In a car truck, a side frame, a bolster, a leaf spring supported by said side frame at spaced points and directly supporting said bolster at spaced points, and coil springs cooperating with said side frame and said bolster intermediate said first named spaced points.

63. In a car truck, a side frame, a bolster, a leaf spring supported by said side frame at spaced points and directly supporting said bolster at spaced points, and coil springs cooperating with said side frame and said bolster intermediate said first named spaced points to increase the energy absorption.

64. In a car truck, a side frame, a bolster, a leaf spring supported by said side frame at spaced points and carrying said bolster at spaced points, coil springs disposed between said leaf spring and said side frame so that the leaves of said leaf spring are compressed between said bolster and said coil springs.

65. In a car truck, a side frame having axle mountings, a leaf spring having spaced supports on said side frame adjacent said axle mountings, resilient means supporting said leaf spring on said side frame intermediate said spaced supports, and a bolster directly supported on said leaf spring.

66. In a car truck, a side frame having axle mountings, a leaf spring having spaced supports on said side frame adjacent said axle mountings, and resilient means supporting said leaf spring on said side frame intermediate said spaced supports, and a bolster directly carried by said leaf spring at spaced points.

67. In a car truck, spaced side frames with cooperating leaf springs, and a bolster securing together said side frames by cooperation with said leaf springs, said leaf springs being adapted to transmit longitudinal loads longitudinally of said truck to said side frames from said bolster.

68. In a car truck, side frames secured in spaced relation by superimposed leaf springs cooperating with a bolster, said leaf springs being adapted to transmit longitudinal loads longitudinally of said truck to said side frames from said bolster.

69. In a car truck, side frames with integral journal boxes, leaf spring seats adjacent said journal boxes, leaf springs extending between said seats, and a bolster retaining said side frames in spaced relation by cooperating with said leaf springs, said leaf springs being adapted to transmit longitudinal loads longitudinally of said truck to said side frames from said bolster.

70. In a car truck, spaced side frames with cooperating semi-elliptic springs, and a bolster securing together said side frames by cooperation with said semi-elliptic springs, said semi-elliptic springs being adapted to transmit longitudinal loads longitudinally of said truck to said side frames from said bolster.

71. In a car truck, side frames secured in spaced relation by superimposed semi-elliptic springs cooperating with a bolster, said semi-elliptic springs being adapted to transmit longitudinal loads longitudinally of said truck to said side frames from said bolster.

72. In a car truck, a side frame having axle mountings, a leaf spring having spaced supports on said side frame adjacent said axle mountings, resilient means supporting said leaf spring on said side frame intermediate said spaced supports, and a bolster supported by said leaf spring and resilient means in the plane of said side frame, the major portion of the load being supported by said resilient means.

73. In a car truck, a side frame having axle mountings, a spring plank carried on said side frame between said axle mountings, a leaf spring having spaced supports on said side frame adjacent said axle mountings, resilient means supporting said leaf spring on said side frame intermediate said spaced supports, and a bolster supported on said leaf spring over said resilient means, and resilient means disposed between said spring plank and leaf spring.

74. In a car truck, the combination of a side frame, a bolster, a group of coil and leaf springs each engaging said side frame and interposed in supporting relation between said bolster and side frame and cooperating under load to increase the energy absorption of the leaf springs, and means for preventing change of the relative positions of the portions of the leaf springs.

75. In a car truck, the combination of a side frame, a bolster, a spring assembly interposed in supporting relation between said bolster and side frame, said assembly including a leaf spring cooperating with a coil spring whereby under load the leaf spring has increased energy absorption, said coil and leaf spring each engaging said side frame, and means for preventing change of the relative positions of the portions of the leaf spring.

76. In a car truck, the combination of a side frame, a bolster, a spring assembly interposed in supporting relation between said bolster and side frame, said assembly including a leaf spring cooperating with a resilient member whereby under load the leaf spring has increased energy absorption, said resilient member and leaf spring each engaging said side frame, and means for preventing change of the relative positions of the portions of the leaf spring.

77. In a car truck, the combination of a side frame, a bolster, a load carrying assembly of coil and leaf springs each engaging said side frame and interposed in supporting relation between said bolster and side frame and cooperating to increase the energy absorbing capacity of the leaf springs, and means for preventing change of the relative positions of the portions of the leaf springs.

78. In a car truck, the combination of a side frame, a bolster, a load carrying assembly of coil and leaf springs each engaging said side frame and interposed in supporting relation between said bolster and side frame and cooperating to increase the energy absorbing capacity of the leaf springs as the load is increased, and means for preventing change of the relative positions of the portions of the leaf springs.

79. In a car truck, the combination of a side frame, a bolster, a group of coil and semi-elliptic springs each engaging said side frame and interposed in supporting relation between said bolster and side frame and cooperating under load to increase the energy absorption of the semi-elliptic springs, and means for preventing change of the relative positions of the portions of the semi-elliptic springs.

80. In a car truck, the combination of a side frame, a bolster, a semi-elliptic spring interposed in supporting relation between said bolster and side frame and cooperating with a coil spring whereby under load the semi-elliptic spring has increased energy absorption, said coil and semi-elliptic spring each engaging said side frame, and means for preventing change of the relative positions of the portions of the semi-elliptic spring.

81. In a car truck, the combination of a side frame, a bolster, a semi-elliptic spring interposed in supporting relation between said bolster and side frame and cooperating with a resilient member whereby under load the semi-elliptic spring has increased energy absorption, said resilient member and semi-elliptic spring each engaging said side frame, and means for preventing change of the relative positions of the portions of the semi-elliptic spring.

82. In a car truck, the combination of a side frame, a bolster, a load carrying assembly of coil and semi-elliptic springs each engaging said side frame and interposed in supporting relation between said bolster and side frame and cooperating to increase the energy absorbing capacity of the semi-elliptic springs, and means for preventing change of the relative positions of the portions of the semi-elliptic springs.

83. In a car truck, the combination of a side frame, a bolster, a load carrying assembly of coil and semi-elliptic springs each engaging said side frame and interposed in supporting relation between said bolster and side frame and cooperating to increase the energy absorbing capacity of the semi-elliptic springs as the load is increased, and means for preventing change of the relative positions of the portions of the semi-elliptic springs.

84. In a car truck, the combination of a side frame, a bolster, a load carrying leaf spring interposed in supporting relation between said bolster and side frame and cooperating with a resilient member whereby the energy absorption of the leaf spring increases as the load increases, said resilient member and leaf spring each engaging said side frame, and means for preventing change of the relative positions of the portions of the leaf spring.

85. In a car truck, the combination of a side frame, a bolster, a load supporting leaf spring interposed in supporting relation between said bolster and side frame and cooperating with a resilient member to increase the energy absorption of the leaf spring, said resilient member and leaf spring each engaging said side frame, and means for preventing change of the relative positions of the portions of the leaf spring.

86. In a car truck, the combination of a side frame, a bolster, a load supporting leaf spring interposed in supporting relation between said bolster and side frame and cooperating with a resilient member to squeeze together the leaves of the leaf spring, said resilient member and leaf spring each engaging said side frame, and means for preventing change of the relative positions of the portions of the leaf spring.

87. In a car truck, the combination of a side frame, a bolster, a load supporting leaf spring interposed in supporting relation between said bolster and side frame and cooperating with a resilient member to squeeze together the leaves of the leaf spring with a force which varies directly with the load, said resilient member and leaf spring each engaging said side frame, and means for preventing change of the relative positions of the portions of the leaf spring.

88. In a car truck, the combination of a side frame, a bolster, a load supporting leaf spring interposed in supporting relation between said bolster and side frame and cooperating with a resilient member to squeeze together the leaves of the leaf spring with a force which increases as the load increases, said resilient member and leaf spring each engaging said side frame, and means for preventing change of the relative positions of the portions of the leaf spring.

89. In a truck, the combination of spaced journal boxes, a rigid frame member connecting said journal boxes and offset downwardly therefrom, spring seat members disposed on said frame member adjacent said journal boxes and spaced therefrom, said frame member being provided with thrust lugs at said seat members, and a resilient member seated on said seat members and abutting said thrust lugs for imparting end thrust thereto.

90. In a truck, the combination of a side frame, spaced wheel and axle assemblies associated therewith, a bolster, a resilient member between said bolster and said side frame and supporting said bolster in the plane of said side frame, and means on said side frame of a different character than said resilient member and cooperating with said resilient member to load said resilient member to thereby increase the amount of energy said resilient member will absorb.

91. In a bolster, the combination of spaced tension and compression members, bearings formed on said compression member, the ends of said bolster having spaced U-shaped portions for embracing a leaf spring assembly, said portions being spaced apart to accommodate a spring band for said spring assembly, and means on said bolster for positioning said bolster on said spring assembly and by cooperative relation with said spring band.

92. In a bolster, the combination of spaced tension and compression members, bearings formed on said compression member, the ends of said bolster having spaced U-shaped portions for embracing a leaf spring assembly, said portions being spaced apart to accommodate a spring band for said spring assembly, and means on said bolster for positioning said bolster on said spring assembly and by embracing engagement with said spring band.

93. In a truck, the combination of a side frame, spaced wheel and axle assemblies associated therewith, a load carrying member, a resilient member between said load carrying member and said side frame and disposed in supporting relation to said load carrying member, and a resilient cushion including resilient pads cooperating with said resilient member substantially beneath the point of support of said load carrying member by said resilient member to thereby increase the amount of energy said resilient member will absorb.

94. In a truck, the combination of a side frame, spaced wheel and axle assemblies associated therewith, a load carrying member, a resilient member between said load carrying member and said side frame, and a resilient cushion cooperating with said resilient member to thereby increase the amount of energy said resilient member will absorb, said resilient cushion being disposed substantially in the plane of said side frame.

95. In a truck, the combination of a side frame, spaced wheel and axle assemblies associated therewith, a load carrying member, a resilient member between said load carrying member and said side frame, and a resilient cushion cooperating with said resilient member to thereby increase the amount of energy said resilient member will absorb, said resilient cushion being disposed substantially in the plane of said side frame and said resilient member.

96. In a truck, the combination of a side frame, spaced wheel and axle assemblies associated therewith, a load carrying member, a resilient member between said load carrying member and said side frame, and a resilient cushion including resilient pads cooperating with said resilient member to thereby increase the amount of energy said resilient member will absorb, said resilient cushion being disposed substantially in the plane of said side frame.

97. In a truck, the combination of a side frame, spaced wheel and axle assemblies associated therewith, a load carrying member, a resilient member between said load carrying member and said side frame, and a resilient cushion including resilient pads cooperating with said resilient member to thereby increase the amount of energy said resilient member will absorb, said resilient cushion being disposed substantially in the plane of said side frame and said resilient member.

98. In a car truck, the combination of a side frame having journal boxes cooperating with wheel and axle assemblies, a load carrying member, seat members adjacent said journal boxes and fixed with respect to said side frame, friction means engaging said seats and supporting said load carrying member on said seats, and a plurality of resilient means each of different character interposed between said load carrying member and side frame, one of said resilient means engaging said side frame and operating upon said friction means to modify the normal function of said friction means upon movement of said load carrying member.

99. In a car truck, the combination of a side frame having journal boxes cooperating with wheel and axle assemblies, a load carrying member, seat members adjacent said journal boxes, friction means supporting said load carrying member on said seats, and a plurality of resilient means each of different character interposed between said friction means and side frame and spaced from said seats, one of said resilient means engaging said friction means.

100. In a car truck, the combination of a side frame having journal boxes cooperating with wheel and axle assemblies, a bolster, seat members adjacent said journal boxes and fixed with respect to said side frame, friction means supporting said bolster on said seats, and a plurality of resilient means each of different character interposed between said bolster and side frame and spaced from said seats, one of said resilient means engaging said side frame and operating upon said friction means to modify the normal function of said friction means upon movement of said load carrying member.

101. In a car truck, the combination of a side frame having journal boxes cooperating with wheel and axle assemblies, a load carrying member, seat members adjacent said journal boxes and fixed with respect to said side frame, friction means supporting said load carrying member on said seats, and a plurality of resilient means each of different character interposed in series between said load carrying member and side frame and spaced from said seats, one of said resilient means engaging said side frame and operating upon said friction means to modify the normal function of said friction means upon movement of said load carrying member.

102. In a car truck, the combination of a side frame having journal boxes cooperating with wheel and axle assemblies, a load carrying member, seat members adjacent said journal boxes, friction means supporting said load carrying member on said seats, and a plurality of resilient means each of different character interposed in series between said friction means and side frame and spaced from said seats, one of said resilient means engaging said friction means.

103. In a car truck, spaced side frames with cooperating leaf springs, a bolster securing together said side frames by cooperation with said leaf springs, said leaf springs being adapted to transmit longitudinal loads longitudinally of said truck to said side frames from said bolster, and means on said side frame cooperating with said leaf springs for taking lateral loads from said leaf springs.

104. In a car truck, side frames secured in spaced relation by superimposed leaf springs co-operating with a bolster, said leaf springs being adapted to transmit longitudinal loads longitudinally of said truck to said side frames from said bolster, and means on said side frame cooperating with said leaf springs for taking lateral loads from said leaf springs.

105. In a car truck, side frames with integral journal boxes, leaf spring seats adjacent said journal boxes, leaf springs extending between said seats, a bolster retaining said side frames in spaced relation by cooperating with said leaf springs, said leaf springs being adapted to transmit longitudinal loads longitudinally of said truck to said side frames from said bolster, and means on said side frame cooperating with said leaf springs for taking lateral loads from said leaf springs.

106. In a car truck, spaced side frames with cooperating semi-elliptic springs, a bolster securing together said side frames by cooperation with said semi-elliptic springs, said semi-elliptic springs being adapted to transmit longitudinal loads longitudinally of said truck to said side frames from said bolster, and means on said side frame cooperating with said semi-elliptic springs for taking lateral loads from said semi-elliptic springs.

107. In a car truck, side frames secured in spaced relation by superimposed semi-elliptic springs cooperating with a bolster, said semi-elliptic springs being adapted to transmit longitudinal loads longitudinally of said truck to said side frames from said bolster, and means on said side frame cooperating with said semi-elliptic springs for taking lateral loads from said semi-elliptic springs.

108. In a car truck, a side frame, a bolster, and differential resilient means between said bolster and said side frame and engaged by said bolster, said differential means cooperating with each other to increase the amount of frictional energy absorption thereof, said differential means being disposed longitudinally of said truck.

109. In a car truck, the combination of a side frame having journal boxes cooperating with wheel and axle assemblies, a bolster, seat members fixed with respect to said side frame adjacent said journal boxes, friction means engaging said seats and supportingly engaging said bolster in the plane of said side frame, and resilient means interposed between said bolster and side frame for supporting relation to said bolster and operating upon said friction means to modify the normal function of said friction means upon movement of said bolster, said side frame being provided with brake hanger brackets.

110. In a car truck, the combination of a side frame having journal boxes cooperating with wheel and axle assemblies, a load carrying member, seat members adjacent said journal boxes, friction means supporting said load carrying member on said seats, and a plurality of resilient means each of different character interposed between said friction means and side frame, one of said resilient means engaging said friction means and side frame and operating upon said friction means to modify the normal function of said friction means upon movement of said load carrying member.

111. In a car truck, the combination of a side frame having journal boxes cooperating with wheel and axle assemblies, a load carrying member, seat members adjacent said journal boxes, friction means supporting said load carrying member on said seats, and a plurality of resilient means each of different character interposed in series between said friction means and side frame, one of said resilient means engaging said friction means and side frame and operating upon said friction means to modify the normal function of said friction means upon movement of said load carrying member.

112. In a car truck, the combination of a side frame having journal boxes cooperating with wheel and axle assemblies, a load carrying member having a center bearing, fixed seat members adjacent said journal boxes, friction means engaging said seats and supporting said load carrying member by engagement therewith, and resilient means of different character than said friction means interposed in such an arrangement with said friction means and load carrying member and side frame that the load is transmitted to said side frame directly from said friction means and through said friction means and resilient means.

ALFRED H. OELKERS.